Patented Jan. 13, 1953

2,625,569

UNITED STATES PATENT OFFICE 2,625,569

TRIOXEPANE POLYMERS

William F. Gresham and Clarence D. Bell, Wilmington, Del., assignors to E. I. du Pont de Nemours & Company, Wilmington, Del., a corporation of Delaware No Drawing. Original application December 19, 1945, Serial No. 636,078. Divided and this application October 7, 1948, Serial No. 53,375

7 Claims. (Cl. 260—615)

1

This invention relates to trioxepane and to its polymers together with methods for their preparation. This application is a division of our copending application S. N. 636,078, now Patent No. 2,475,610, filed December 19, 1945.

1,3,5-trioxepane

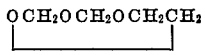

is a colorless liquid boiling at about 132° C. at 760 mm. pressure and at about 57° C. at 50 mm. pressure. It may be considered as a formaldehyde addition product of 1,3-dioxolane and produced in accord with the equation

It has been found that, in accord with the process of this case, trioxepane can be converted into linear polymeric compounds which are believed to have the structural formula

in which $x$ is an integer greater than 1.

An object of the present invention is to provide new compositions of matter. Another object is to provide a process for the preparation of 1,3,5-trioxepane and a process for the preparation of polymeric forms of 1,3,5-trioxepane. A further object of the invention is to provide conditions for preparing the monomeric 1,3,5-trioxepane and its polymers. Other objects and advantages of the invention will hereinafter appear.

1,3,5-trioxepane can be prepared in various ways such, for example, as by the condensation of formaldehyde with 1,3-dioxolane under substantially anhydrous conditions. It may likewise be made by the reaction of ethylene glycol with a molar excess of formaldehyde under such conditions that the water formed as a result of the reaction is removed as formed. As this reaction produces 1,3-dioxolane, it is in a sense the same general type of reaction as that first described. These reactions are conducted in the presence of acid condensation catalysts. Any suitable acid catalyst may be used and may be present in amounts ranging from 0.02 to 5%. Acid catalysts generally are suitable and more particularly the inorganic acids and their acid salts such as sulfuric acid, hydrochloric acid, phosphoric acid, boron fluoride (and its addition products) paratoluene sulfonic acid, sodium acid sulfate, sodium acid phosphate, and the like.

An alternate method of preparing 1,3,5-trioxepane is provided by a process wherein two moles of formaldehyde are reacted per mole of ethylene glycol, the reaction being conducted under conditions such that the water formed as a result of the reaction is removed as rapidly as formed. In this reaction 1 mole of formaldehyde reacts per mole of ethylene glycol to give 1,3-dioxolane and water. Upon removal of the water there remains a mole of formaldehyde per mole of 1,3-dioxolane which under the anhydrous conditions described herein will result in the production, under the conditions specified, of 1,3,5-trioxepane and/or polymers thereof.

Along with the formation of 1,3,5-trioxepane, polymeric compounds are formed when formaldehyde is reacted with 1,3-dioxolane, the manner of processing determining the proportionation of monomer and polymer produced. The monomer can be removed from the reaction mixture by distillation at low pressures in the presence or in the absence of the catalyst used during the reaction. If the catalyst is neutralized prior to the distillation the yield of 1,3,5-trioxepane will not be as great as it will be if the catalyst is not neutralized prior to the distillation. This, it is believed, is due to the decomposition of the polymers present to 1,3,5-trioxepane because of the presence of the acid catalysts. If the solution is neutral the polymer does not decompose as readily, if at all, to the monomer and consequently only the monomer present is removed during the distillation.

Inasmuch as, therefore, the reaction of formaldehyde with 1,3-dioxolane results in the formation of 1,3,5-trioxepane as well as polymers thereof, the operator has the choice of selecting a procedure for the preparation of the monomer or the polymer; if the former, distillation is conducted in the presence of the acid used during the reaction; if the latter, the acid is first neutralized and the 1,3,5-trioxepane separated leaving a substantially 1,3,5-trioxepane-free polymer.

The 1,3-dioxolane is reacted with any compound which is equivalent substantially to anhydrous formaldehyde such, for example, as paraformaldehyde, trioxane, and the like. Inasmuch as one mole of formaldehyde reacts with one mole of 1,3-dioxolane to form trioxepane this proportion of reactants may be employed but it has been found that polymeric products can be produced with ratios ranging from ¼ to 10 or more moles of 1,3-dioxolane per mole of the aldehyde as formaldehyde, paraformaldehyde, or trioxane. The polymeric products may vary in their molecular structure with regard to the number of formal groups, —OCH$_2$O— groups present per linear 1,3-dioxolane group, —OCH$_2$OCH$_2$CH$_2$—, the polymeric structure being determined inter alia by reaction conditions, proportions of reactants, etc., e. g. the greater the concentration of formaldehyde or equivalent, the greater the number of formal groups in the polymer and vice versa.

The reaction of formaldehyde with the 1,3-dioxolane is conducted by heating the mixture of 1,3-dioxolane and formaldehyde at temperatures between 50 to 200° C. At temperatures above 95° C. pressures are preferably employed in order to prevent the loss of formaldehyde from the reaction mixture. Pressures, if used, may range from 3 to 100 atmospheres or more; elevated pressures do not appear to deleteriously influence the reaction and consequently the upper limit of pressure is determined only by the strength of the equipment used.

The 1,3-dioxolane and formaldehyde are reacted under the above conditions for from 1 or more hours at a temperature below about 95° C. and at shorter time intervals if pressures are employed and temperatures above 95° C. are used. If high molecular weight polymers are desired, the reaction is effected at low temperatures, i. e. temperatures below 95° C. which give mild reaction rates with high molecular weight products while on the contrary if the reaction is conducted at higher temperatures a faster reaction rate occurs tending to produce lower molecular weight products.

The polymers are decomposed by heating preferably under reduced pressures in the presence of an acid condensation catalyst. Pressures below 50 mm. and preferably below 10 mm. are employed with temperatures ranging between 50° C. and about 300° C. Preferably the decomposition temperatures used are not higher than are necessary to distill over the trioxepane from the polymer. Higher temperatures may be used, however, and while they will increase the rate of decomposition they tend to unduly decompose the polymer to products other than trioxepane.

The examples given illustrate preferred embodiments of the invention in which parts are by weight unless otherwise indicated:

*Example 1.*—An open vessel was charged with 148 parts (2 moles) of 1,3-dioxolane, 31.6 parts (1 mole) of paraformaldehyde, and 0.96 part of sulfuric acid. The vessel was placed on a steam bath and heated for 3½ hours. At the end of this period a viscous, clear, almost colorless liquid polymer was formed. This liquid was placed in a pressure resisting vessel, a vacuum of about 8 mm. applied, and the liquid heated to a temperature of about 100° C. The vapors were collected in traps cooled with solid carbon dioxide. The condensate was then subjected to distillation at atmospheric pressure. Under these conditions 33.9 parts of 1,3,5-trioxepane was obtained which had a boiling point of 129.5 to 131.5° C.

*Example 2.*—The process of Example 1 was repeated using 666 parts (9 moles) of 1,3-dioxolane, 90 parts (3 moles) of paraformaldehyde and 3 parts of sulfuric acid. The reaction in this case, however, was discontinued after two hours heating on a stream bath and the product which was a cloudy viscous liquid was heated to a temperature of about 100° C. under a high vacuum, approximately 3 mm.; 146.4 parts of 1,3,5-trioxepane having a boiling point of 129° C. was obtained.

*Example 3.*—The reaction of Example 1 was repeated with 333 parts (4.5 moles) of 1,3-dioxolane, 45 parts (1.5 moles) of trioxane and 1.5 parts of sulfuric acid. In this case the heating on a steam bath was continued for 1½ hours and a very viscous product formed. This product was treated under the conditions specified in Example 2. 49.1 parts of 1,3,5-trioxepane having a boiling point between 128 and 130° C. was obtained.

*Example 4.*—An open reaction vessel was charged with 2 moles of 1,3-dioxelane, 1 mole of paraformaldehyde and about 1% sulfuric acid as the catalyst. The reaction mixture was heated on a steam bath for 8 hours. A 15% sodium methoxide solution in methanol was added to the reaction mixture until it was basic to litmus. The thus neutralized liquid which was fairly viscous was slowly distilled on an oil bath and 1,3,5-trioxepane collected in the condensate having a carboxyl number of 992 equivalent to 92.2% pure trioxepane.

*Example 5.*—An open reaction vessel was charged with 20 parts of 1,3,5-trioxepane and boron fluoride gas was introduced to give approximately 0.017% by weight of the trioxepane. The vessel was closed and polymerization permitted to proceed at substantially room temperature for 56 days. A viscous solution was obtained which was made slightly basic to litmus paper by sodium methoxide in methanol and after filtering was heated on an oil bath at a pressure of from 1 to 3 mm. whereby a polymeric product was distilled over having a molecular weight of about 480.

*Example 6.*—A reaction vessel was charged with 37.3 parts of 1,3,5-*t*rioxepane and about 0.6% sulfuric acid as the catalyst. The resulting mixture was heated for 9 hours on a water bath to a temperature between 70 and 80° C. A viscous liquid was obtained to which sodium methoxide in methanol was added until a pH of about 5 was obtained. The resulting mixture was heated for 1 hour on a steam bath and then subjected to distillation at a pressure of about 3 mm. A viscous condensate was obtained which upon analysis was found to be a polymer of 1,3,5-trioxepane having a molecular weight of about 930.

The examples illustrate two methods whereby 1,3,5-trioxepane can be converted to polymeric forms. One method involves reacting 1,3-dioxolane with formaldehyde under substantially anhydrous conditions during which process the polymers are formed along with monomeric 1,3,5-trioxepane. This second method involves polymerizing 1,3,5-trioxepane directly which is effected by contacting the trioxepane with an acid catalyst and allowing the polymerization to proceed at below or above room temperature until the desired polymeric form has been obtained. The type of catalyst used and temperature employed for the polymerization determine the time required to effect the polymerization. Temperatures below room temperature usually involve reactions measured in days while polymerizations above room temperature are complete in a matter of hours.

Contrariwise, 1,3,5-trioxepane can be prepared by decomposition or cracking of polymeric forms of 1,3,5-trioxepane. This reconversion of the polymer to the monomeric form can be effected by heating in the presence of an acid catalyst, such as those described above, while distilling off the monomer under reduced pressures.

Valuable products can be obtained by reacting the polymeric 1,3,5-trioxepane with organic compounds. For example, by reacting these polymers with the monocarboxylic or polycarboxylic aromatic or aliphatic organic acids modified forms of the acid are obtained wherein the polymer group ($-OCH_2OCH_2OCH_2CH_2-$) is combined with the acid considerably modifying its properties in accord with the number of the polymer groups added. By this procedure water-insoluble organic acids of high molecular weight such, for example, as oleic, stearic, palmitic and like acids can be converted to water-soluble modifications of the acid by heating the acid with polymeric 1,3,5-trioxepane in the presence of an acid catalyst.

The polymers of 1,3,5-trioxepane may likewise be combined with other organic compounds to modify their physical and chemical properties and especially valuable products are obtainable when the polymers are reacted in the presence of an acid catalyst with esters, alcohols, ethers, amines, amides, nitriles, ketones, acetals (linear and cyclic), phenols, olefinic compounds and aromatic hydrocarbons. The principal characteristic of the products resulting from this modification reaction is an increased water solubility. This is especially significant in converting the high molecular weight water-insoluble alcohols such as nonyl, decyl, dodecyl, and similar alcohols to water-soluble modification products thereof.

1,3,5-trioxepane is an excellent solvent and due to its comparatively high boiling point may be used as an intermediate boiling solvent in the preparation of lacquers, cellulose ester dopes, etc. The polymeric product may be used as a plasticizer in cellulose organic and inorganic ethers and esters and in the polyamide, urea-formaldehyde, phenol formaldehyde and similar resinous compositions.

We claim:

1. A process for the preparation of polymeric 1,3,5-trioxepane which comprises mixing 1,3-dioxolane and an aldehyde, heating, under substantially anhydrous conditions, at least ¼ mole of 1,3-dioxolane per mole of the aldehyde as a compound of the group consisting of formaldehyde, paraformaldehyde, and trioxane in the presence of an acidic condensation catalyst, and thereafter neutralizing the catalyst and separating the 1,3,5-trioxepane from the polymeric 1,3,5-trioxepane.

2. A process for the preparation of polymeric 1,3,5-trioxepane which comprises heating under substantially anhydrous conditions and at a temperature between 50 and 200° C. at least ¼ mole of 1,3-dioxolane per mole of formaldehyde in the presence of an acidic condensation catalyst, and thereafter neutralizing the catalyst and separating the 1,3,5-trioxepane from the polymeric 1,3,5-trioxepane.

3. A process for the preparation of polymeric 1,3,5-trioxepane which comprises mixing 1,3-dioxolane and an aldehyde, heating, under substantially anhydrous conditions, and at a temperature between 75° and 95° C., at least ¼ mole of 1,3-dioxolane per mole of paraformaldehyde in the presence of an acidic condensation catalyst, and thereafter neutralizing the catalyst and separating the 1,3,5-trioxepane from the polymeric 1,3,5-trioxepane.

4. A process for the preparation of polymeric 1,3,5-trioxepane which comprises heating monomeric 1,3,5-trioxepane in the presence of an acidic condensation catalyst, neutralizing the catalyst, distilling off the monomeric 1,3,5-trioxepane and recovering the polymeric 1,3,5-trioxepane.

5. A process for the preparation of polymeric 1,3,5-trioxepane which comprises polymerizing by heating monomeric 1,3,5-trioxepane in the presence of an acidic condensation catalyst and thereafter neutralizing said catalyst and separating the 1,3,5-trioxepane from the polymeric 1,3,5-trioxepane.

6. A process for the preparation of polymeric 1,3,5-trioxepane which comprises mixing under substantially anhydrous conditions, 1,3-dioxolane and an aldehyde, heating, at a temperature between 50 and 200° C., at least ¼ mole of 1,3-dioxolane per mole of the aldehyde as a compound of the group consisting of formaldehyde, paraformaldehyde and trioxane in the presence of an acidic condensation catalyst, neutralizing the catalyst and separating the monomeric 1,3,5-trioxepane from the polymeric 1,3,5-trioxepane by distillation.

7. A homopolymer of 1,3,5-trioxepane having the structural formula $$(-OCH_2OCH_2OCH_2CH_2)_x$$

in which $x$ is an integer greater than 1.

WILLIAM F. GRESHAM.
CLARENCE D. BELL.

REFERENCES CITED

The following references are of record in the file of this patent:

UNITED STATES PATENTS

| Number | Name | Date |
|---|---|---|
| 2,350,350 | Gresham | June 6, 1944 |
| 2,473,994 | Gresham | June 21, 1949 |